(12) United States Patent
Han et al.

(10) Patent No.: US 11,216,931 B2
(45) Date of Patent: Jan. 4, 2022

(54) DISPLAY DEVICE FAILURE DETECTION METHOD, DEVICE AND SYSTEM

(71) Applicant: XI'AN NOVASTAR TECH CO., LTD., Shaanxi (CN)

(72) Inventors: Dan Han, Shaanxi (CN); Cheng Yang, Shaanxi (CN); Guoli Sun, Shaanxi (CN)

(73) Assignee: XI'AN NOVASTAR TECH CO., LTD., Shaanxi (CN)

( * ) Notice: Subject to any disclaimer, the term of this patent is extended or adjusted under 35 U.S.C. 154(b) by 0 days.

(21) Appl. No.: 16/772,820

(22) PCT Filed: Sep. 25, 2018

(86) PCT No.: PCT/CN2018/107288
§ 371 (c)(1),
(2) Date: Jun. 15, 2020

(87) PCT Pub. No.: WO2020/061736
PCT Pub. Date: Apr. 2, 2020

(65) Prior Publication Data
US 2021/0217157 A1 Jul. 15, 2021

(51) Int. Cl.
*G06T 7/00* (2017.01)
*G09G 3/00* (2006.01)
(Continued)

(52) U.S. Cl.
CPC ....... *G06T 7/0002* (2013.01); *G01N 21/8851* (2013.01); *G08B 5/22* (2013.01);
(Continued)

(58) Field of Classification Search
CPC ......... G06T 7/0002; G06T 2207/10024; G06T 2207/30168; G06T 2207/10016;
(Continued)

(56) References Cited

U.S. PATENT DOCUMENTS 6,219,443 B1 * 4/2001 Lawrence ............. G06T 7/0006
324/760.01
8,184,133 B2 * 5/2012 Morvan ............... G09G 3/3659
345/690
(Continued)

FOREIGN PATENT DOCUMENTS

| CN | 102184694 A | 9/2011 |
| CN | 105242618 A | 1/2016 |
| CN | 205487272 U | 8/2016 |

OTHER PUBLICATIONS

Deng, B., et al., "Picture compression method in AOI (Automatic Optic Inspection) detection system and display panel defect detection system," Machine-translation of CN107333124 A, published Nov. 7, 2017.*

*Primary Examiner* — Xuemei G Chen
(74) *Attorney, Agent, or Firm* — Gang Yu

(57) ABSTRACT

A display device failure detection method, device and system are disclosed. The display device failure detection method includes that: at least one detection picture image acquired by an image acquisition device when a target display device regularly displays a detection picture sequence is received, and at least one image to be detected is determined from the at least one detection picture image (S11); at least one region to be detected corresponding to at least one display region of the target display device in the at least one image to be detected is determined, and image data of the at least one region to be detected is processed to obtain at least one image processing result (S13); and whether a display exception occurs to the target display device is judged according to the image processing result (S15).

16 Claims, 2 Drawing Sheets

(51) Int. Cl.
*G01N 21/88* (2006.01)
*G08B 5/22* (2006.01)
*G09F 9/33* (2006.01)

(52) U.S. Cl.
CPC ............... *G09F 9/33* (2013.01); *G09G 3/00* (2013.01); *G06T 2207/10016* (2013.01); *G06T 2207/10024* (2013.01); *G06T 2207/30168* (2013.01)

(58) Field of Classification Search
CPC ........ G08B 5/22; G01N 21/8851; G09F 9/33; G09G 3/00; H04N 17/04
See application file for complete search history.

(56) References Cited

U.S. PATENT DOCUMENTS

| | | | | |
|---|---|---|---|---|
| 8,867,817 | B1* | 10/2014 | Cooper | G06T 7/0004 382/141 |
| 9,979,956 | B1* | 5/2018 | D'Amico | G06T 7/11 |
| 2007/0047801 | A1* | 3/2007 | Kojima | G09G 3/006 382/149 |
| 2007/0206182 | A1* | 9/2007 | Ishikawa | G01N 21/94 356/237.2 |
| 2010/0157044 | A1* | 6/2010 | Mori | G06T 7/0004 348/92 |
| 2015/0103383 | A1* | 4/2015 | Dowling | H04N 1/00225 358/402 |
| 2016/0112702 | A1* | 4/2016 | Qian | H04N 17/004 348/177 |
| 2016/0343121 | A1* | 11/2016 | Hu | G06T 7/0004 |
| 2017/0351757 | A1* | 12/2017 | Strober | G06F 16/951 |
| 2018/0210774 | A1* | 7/2018 | Young | G06F 11/0769 |
| 2018/0211374 | A1* | 7/2018 | Tanaka | G06T 7/001 |
| 2018/0246044 | A1* | 8/2018 | Zhang | G01N 21/95 |
| 2018/0253687 | A1* | 9/2018 | Bornitz | G06Q 10/0833 |
| 2019/0011733 | A1* | 1/2019 | Chien | G02B 21/0036 |
| 2019/0035361 | A1* | 1/2019 | Luo | G09G 5/10 |
| 2019/0163430 | A1* | 5/2019 | Lee | G09G 5/006 |
| 2019/0204629 | A1* | 7/2019 | Li | G02F 1/13363 |
| 2020/0043443 | A1* | 2/2020 | Takao | G09G 5/10 |
| 2020/0357109 | A1* | 11/2020 | Wen | G06N 3/0454 |

* cited by examiner

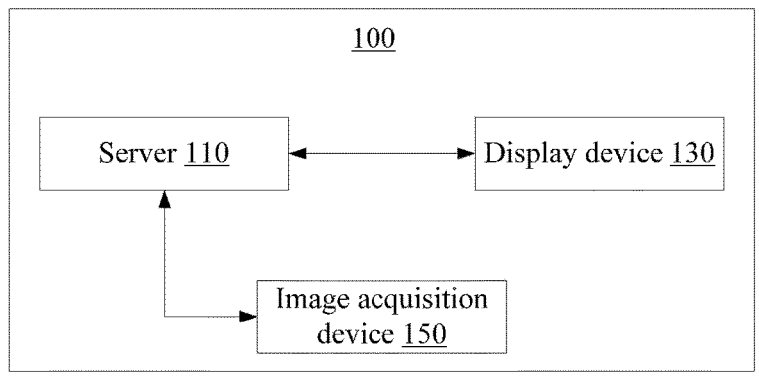

Fig. 1

| At least one detection picture image acquired by an image acquisition device when a target Display device regularly displays a detection picture sequence is received, and at least one image to be detected is determined from the at least one detection picture image | S11 |

↓

| At least one region to be detected corresponding to at least one display region of the target display device in the at least one image to be detected is determined, and image data of the at least one region to be detected is processed to obtain at least one image processing result | S13 |

↓

| Whether a display exception occurs to the target display device or not is judged according to the at least one image processing result | S15 |

↓

| When the display exception occurs to the target display device, a failure detection result or a failure alarm is output | S17 |

Fig. 2

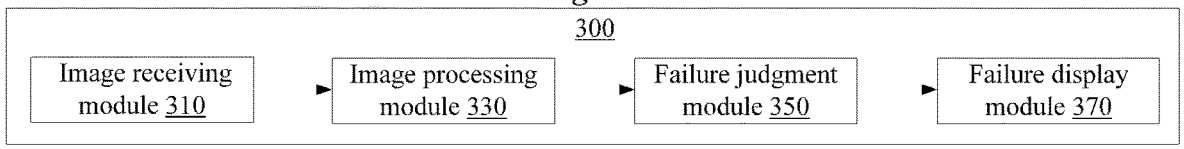

Fig. 3

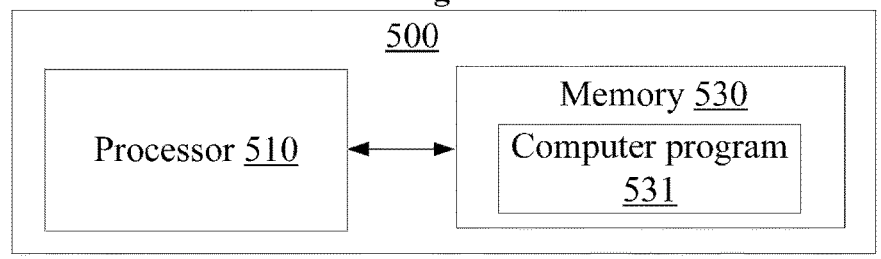

Fig. 4

DISPLAY DEVICE FAILURE DETECTION METHOD, DEVICE AND SYSTEM

TECHNICAL FIELD

The present disclosure relates to the technical field of displaying, and particularly to a display device failure detection method, device and system.

BACKGROUND

At present, it is increasingly common to display broadcast information such as an advertisement by using of a display device such as a Light Emitting Diode (LED) display system. In a using process of a display screen, some failures such as a black block, a bright block or a large-area blank screen may inevitably occur. However, a user may not timely learn a playing condition of the display screen, particularly, the failures of a remote display screen, and consequently, the failures of the display screen may not be timely eliminated, bringing influence to a playing effect of the display screen. In addition, the user is required to manually detect and judge the failures of the display screen, the detection accuracy and efficiency are relatively low, and the labor cost is high.

SUMMARY

For the problems, embodiments of the present disclosure provide a display device failure detection method, device and system.

According to an aspect, the embodiments of the present disclosure provide a display device failure detection method, which may include that: at least one detection picture image acquired by an image acquisition device when a target display device regularly displays a detection picture sequence is received, and at least one image to be detected is determined from the at least one detection picture image; at least one region to be detected corresponding to at least one display region of the target display device in the at least one image to be detected is determined, and image data of the at least one region to be detected is processed to obtain at least one image processing result; and whether a display exception occurs to the target display device is judged according to the at least one image processing result.

In an embodiment of the present application, the operation that the at least one region to be detected corresponding to the at least one display region of the target display device in the at least one image to be detected is determined may include that: at least one labeled region corresponding to the at least one display region of the target display device in at least one test image is labeled; and at least one image region corresponding to the at least one labeled region in the at least one image to be detected is determined as the at least one region to be detected, the at least one test image being any image including the target display device.

In an embodiment of the present application, the at least one labeled region may be smaller than or equal to the at least one display region of the target display device.

In an embodiment of the present application, the display device failure detection method may further include that: when the display exception occurs to the target display device, a failure detection result or a failure alarm is output.

In an embodiment of the present application, the display device failure detection method may further include that: the target display device is selected from a display device list responsive to a user operation or according to a predetermined selection strategy, and device information of the target display device is output.

In an embodiment of the present application, the detection picture sequence may include a first picture, a second picture and a third picture that are sequentially displayed, wherein the first picture and the second picture may be different pictures, and the first picture and the third picture may be the same picture; and the first picture and the third picture may be monochromatic colored pictures, and the second picture may be a pure black picture.

In an embodiment of the present application, the operation that whether the display exception occurs to the target display device is judged according to the at least one image processing result may include that: when the at least one image processing result is that an exceptional display region is found in the at least one region to be detected in the at least one image to be detected, it is determined that the display exception occurs to the target display device.

In an embodiment of the present application, the operation that the at least one detection picture image acquired by the image acquisition device when the target display device regularly displays the detection picture sequence is received and the at least one image to be detected is determined may include that: the image acquisition device is turned on, wherein the image acquisition device corresponding to the target display device; when the target display device regularly displays the detection picture sequence, the at least one detection picture image acquired by the image acquisition device according to a preset acquisition rule is received; and the at least one detection picture image screened is determined as the at least one image to be detected.

In an embodiment of the present application, the at least one image to be detected may be stored to at least one specified storage address in the image acquisition device, wherein the storage address being a File Transfer Protocol (FTP) address.

According to another aspect, the present disclosure provides a display device failure detection device, which may include: an image receiving module, configured to receive at least one detection picture image acquired by an image acquisition device when a target display device regularly displays a detection picture sequence and determined at least one image to be detected from the at least one detection picture image; an image processing module, configured to determine at least one region to be detected corresponding to at least one display region of the target display device in the at least one image to be detected and processing image data of the at least one region to be detected to obtain at least one image processing result; and a failure judgment module, judging whether a display exception occurs to the target display device according to the at least one image processing result.

In an embodiment of the present application, the image processing module is configured to perform the following steps to determine the at least one region to be detected corresponding to the at least one display region of the target display device in the at least one image to be detected: at least one labeled region corresponding to the at least one display region of the target display device in at least one test image is labeled; and at least one image region corresponding to the at least one labeled region in the at least one image to be detected is determined as the at least one region to be detected, wherein the at least one test image being any image including the at least one display region of the target display device.

In an embodiment of the present application, the display device failure detection device may further include a failure display module, configured to output a failure detection result or a failure alarm when the display exception occurs to the target display device.

In an embodiment of the present application, the detection picture sequence may include a first picture, a second picture and a third picture that are sequentially displayed, wherein the first picture and the second picture may be different pictures, and the first picture and the third picture may be the same picture; and the first picture and the third picture may be monochromatic colored pictures, and the second picture may be a pure black picture.

In an embodiment of the present application, the failure judgment module is configured to perform the following step: when the at least one image processing result is that an exceptional pixel is found in the at least one region to be detected in the at least one image to be detected, the display exception occurs to the target display device is determined.

According to another aspect, the present disclosure provides a display device failure detection system, which may include a memory and a processor connected with the memory, wherein the memory may store a computer program, and the processor may run the computer program to execute any above mentioned display device failure detection method.

According to another aspect, the present disclosure provides a computer-readable medium, which may store a computer-executable instruction, the computer-executable instruction being configured to execute any above mentioned display device failure detection method.

BRIEF DESCRIPTION OF THE DRAWINGS

In order to describe the technical solutions in the embodiments of the present disclosure more clearly, the drawings required to be used for descriptions about the embodiments will be simply introduced below. It is apparent that the drawings described below are only some embodiments of the present application. Those of ordinary skill in the art may further obtain other drawings according to these drawings without creative work.

FIG. 1 is a structure diagram of a display device failure detection apparatus according to an embodiment of the present application;

FIG. 2 is a flowchart of a display device failure detection method according to another embodiment of the present application;

FIG. 3 is a structure diagram of a display device failure detection device according to another embodiment of the present application;

FIG. 4 is a structure diagram of a display device failure detection system according to another embodiment of the present application.

DETAILED DESCRIPTION OF THE EMBODIMENTS

Figure 5:
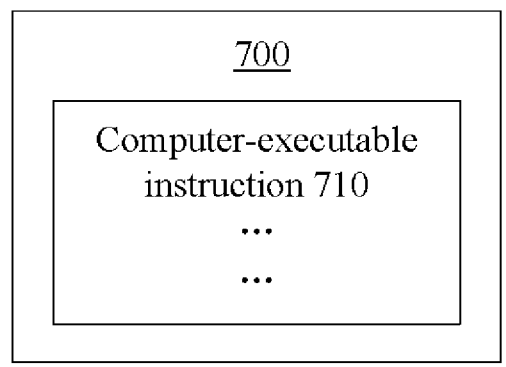
FIG. 5 is a structure diagram of a computer-readable medium according to another embodiment of the present application.

The technical solutions in embodiments of the present disclosure will be clearly and completely described below in combination with the drawings in the embodiments of the present application. It is apparent that the described embodiments are only part of the embodiments of the present disclosure but not all of the embodiments. All other embodiments obtained by those of ordinary skill in the art based on the embodiments in the present disclosure without creative work shall fall within the scope of protection of the present application.

Referring to FIG. 1, FIG. 1 is a structure diagram of a display device failure detection apparatus according to an embodiment of the present application. As shown in FIG. 1, the display device failure detection apparatus 100 includes a server 110, a display device 130 and an image acquisition device 150.

The display device 130 is, for example, an LED synchronous system, an LED asynchronous system, a Liquid Crystal Display (LCD) display system and a Plasma Display Panel (PDP) display system. For example, the LED synchronous system includes a Personal Computer (PC), a sending card, a receiving card and an LED lamp panel. The LED lamp panel has at least one display region. The display device 130 may display various data signals such as a text, an image, a video and a sound in the at least one display region. Herein, there may at least one display devices 130.

The server 110 may be, for example, a computer managing resources and providing service fora user. A large amount of data, for example, images uploaded by the image acquisition device 150, may be stored in the server 110. A selection list listing all the display devices 130 is set in the server 110. Device information of all the display devices 130, for example, storage addresses corresponding to the display devices 130, is stored in the server 110. Herein, the storage address is preferably an FTP address for transmission and storage of a file such as a picture, and of course, may also be a storage address of another type. The user may log in the server 110 to select at least one display device to be detected from the display device list as target display device, and the device information of the target display device may be displayed and viewed. Specifically, the user may input a corresponding instruction through an application program and execute a corresponding operation in the application program to select the display device as the target display device. The application program, for example, iCare software, may be installed in the server 110, may also be installed in a user terminal connected with the server 110, and is configured to receive a picture, manage the picture, analyze image data, judge whether a display exception occurs to the display device according to an image data analysis result, and when the; display exception occurs to the target display device, prompts the user. Of course, a corresponding display device selection strategy, for example, selection strategy according to a region where the display device 130 is located or selection strategy according to a distance, etc. or random automatic selection may also be set in the server 110 and the application program therein.

The image acquisition device 150 may be, for example, a Charge Coupled Device (CCD) camera. The image acquisition device 150 has an operating system and may be connected to the server 110 through, a wired or wireless network. The image acquisition device 150 and the display device 130 are mounted in a one-to-one corresponding manner. The image acquisition device 150 is turned on to point a lens of the image acquisition device 150 at the at least one display region of the display device 130 to acquire a played picture of the at least one display region of the display device 130 to obtain a corresponding image including the at least one display region.

Before image acquisition, it is necessary to set a corresponding parameter such as a link address of the server 110, a login user name and a password in the image acquisition device 150 for connection with the server 110. In addition, it is also necessary to set the storage address in the image acquisition device 150 to bind the display device 130 and the image acquisition device 150. Furthermore, it is necessary to correct system time of the image acquisition device 150, turn on a regular image acquisition function and configure an image acquisition rule. The image acquisition rule may be that the image acquisition device 150 is set to acquire images according to a preset time interval, for example, acquiring the images at an interval of 30 seconds, and may also be that the image acquisition device 150 is set to continuously take pictures at predetermined time, for example, continuously acquiring five pictures at 8:00 a.m., or an image acquisition timetable is set in the image acquisition device 150 and images are acquired according to the image acquisition timetable. Moreover, it is necessary to set image uploading time. After the regular image acquisition function is turned on, the image acquisition device 150 may automatically acquire the image including the at least one display region of the display device 130 according to the set acquisition rule and upload the acquired to the storage address in the server 110 according to the set image uploading time. It should be noted that the user may complete all settings of the image acquisition device 150 through a configuration website provided by the manufacturer of the image acquisition device 150 or a mobile application program. Of course, the image acquisition device 150 through the server and the application program installed in the server 110 is controlled to acquire at least one image according to the preset acquisition rule.

From the above, the display device 130 may display at least one normal picture such as an advertisement video published by an advertiser in the at least one display region, and may also display at least one detection picture to detect a display condition of the display device 130.

When the normal picture is played in the at least one display region of the display device 130, the image acquisition device 150 acquires at least one ordinary image corresponding to the at least one normal picture and uploads the at least one ordinary image to the storage address in the server 110 at corresponding time according to a preset uploading time rule. After the at least one ordinary image uploaded by the image acquisition device 150 is acquired, the user may execute a corresponding operation in the server 110 to select any at least one ordinary image from the storage address in the server 110 as at least one test image, label at least one labeled region corresponding to the at least one display region of the display device 130 in the at least one test image and record data information of the at least one labeled region to complete labeling of the at least one labeled region. Since the at least one display region of the display device 130 may partially or completely appear in the at least one test image, the at least one labeled region is smaller than or equal to a corresponding region size of the at least one display region of the display device 130 in the at least one test image.

When the display condition of the display device 130 is required to be detected, the at least one detection picture may be displayed in the at least one display region of the display device 130. For example, the at least one detection picture display program may be downloaded and installed in the display device 130. The at least one detection picture display program may be, for example, downloaded from the server 110, and of course, may also be acquired by other methods. The present disclosure is not limited thereto. At least one displaying parameter of at least one detection picture sequence, for example, displaying starting time and a displaying time length, may be preset in the at least one detection picture display program. Of course, the preset at least one displaying parameter can be modified or regulated in the at least one detection picture display program as required through the server 110 and the application program installed in the server 110. The at least one detection picture display program installed in the display device 130 regularly displays the detection picture sequence at preset time, for example, 8:00 a.m., in the at least one display region of the display device 130 automatically or under the control of the server 110, the playing time length can be 2 minutes. Herein, the detection picture sequence is configured to detect whether the display exception occurs to the display device 130. The detection picture sequence preferably includes a first picture, a second picture and a third picture that are sequentially displayed. The first picture and the third picture are the same picture, and the first picture and the second picture are different pictures. Preferably, the second picture is a pure black picture. The first picture is a monochromatic colored picture. Furthermore, the first picture is a monochromatic light-colored picture, for example, a pure light blue (RGB: 193, 210, 240) picture and a pure light purple (RGB: 218, 112, 214) picture. The displaying time length of the first picture is further set, the second picture and the third picture to be, for example, 40 seconds respectively. Of course, different displaying time length may also be set for the first picture, the second picture and the third picture. For example, the displaying time length of the first picture and the third picture are 30 seconds respectively, and the displaying time length of the second picture is 60 seconds. The present disclosure is not limited thereto. Under a normal condition, the displaying time length of each picture in the detection picture sequence should be more than or equal to the image acquisition time interval of the image acquisition device 150.

When the detection picture sequence is displayed in the at least one display region of the display device 130, the displaying time length of the detection picture sequence is matched with the image acquisition time of the image acquisition device 150, and then the image acquisition device 150 may sequentially acquire the detection picture sequence, for example, the first picture, the second picture and the third picture that are sequentially displayed, to obtain corresponding at least one detection picture image. According to matching of different displaying time lengths of the detection picture sequence and the image acquisition time of the image acquisition device 150, different numbers of detection picture images may be obtained, for example. Preferably, the at least one detection picture image is a detection picture image group consisting of two or three detection picture images. The detection picture image group includes, for example, two images, i.e., a first detection picture image corresponding to the first picture or the third picture and a second detection picture image corresponding to the second picture, or includes three images, i.e., a first detection picture image corresponding to the first picture, a second detection picture image corresponding to the second picture and a third detection picture image corresponding to the third picture. After the at least one ordinary image and the detection picture image (group) are obtained, the image acquisition device 150 uploads the ordinary image and the detection picture image (group) to the storage address in the server 110 according to the predetermined image uploading time. Through the specific detection picture sequence and matching of the displaying time length and the image acquisition time, it may be ensured that the image acquisition device 150 may acquire an image corresponding to a black picture and an image corresponding to at least one monochromatic light-colored picture to judge whether the display exception occurs to the at least one display region of the display device 130 more accurately.

After the at least one detection picture image uploaded by the image acquisition device 150 is received, the server 110 recognizes the at least one detection picture image from a large number of pictures stored in the storage address and screens at least one proper detection picture image as at least one image to be detected. Specifically, the server 110 recognizes at least one detection picture image of which acquisition time is in a detection picture sequence playing time bucket in the storage address according to the image acquisition time at first. When the number of the recognized at least one detection picture image is two, it is indicated that one of the two detection picture images acquired by the image acquisition device 130 is one detection picture image corresponding to the first picture or the third picture, and the other detection picture image of the two detection picture images is the other detection picture image corresponding to the second picture, and in such case, the server 110 determines the two detection picture images as images to be detected. When the number of the recognized at least one detection picture image is three, it is indicated that the first of the three detection picture images acquired by the image acquisition device 130 corresponds to the first picture, the second of the three detection picture images corresponds to the second picture and the third of the three detection picture images corresponds to the third picture, and in such case, the server 110 determines the detection picture image corresponding to the first picture or the third picture and the detection picture image corresponding to the second picture as images to be detected.

Then, the server 110 processes image data in at least one corresponding region in the at least one image to be detected. Specifically, the server determines at least one image region corresponding to the at least one labeled region in the at least one image to be detected as at least one region to be detected, and then performs the image data processing on the at least one region to be detected, for example, the server 110 analyzes all pixels in the at least one region to be detected one by one, to obtain at least one image data processing result. Herein, an image data processing method may refer to, for example, an outlier detection method and the like in the conventional art. Specifically, when the at least one image to be detected is the image corresponding to the second picture (pure black picture), there are two processing results, including, for example, that an exceptional bright spot or bright block exists in the at least one region to be detected in the at least one image to be detected and no exceptional bright spot or bright block exists in the at least one region to be detected in the at least one image to be detected. When the at least one image to be detected is the image corresponding to the first picture (monochromatic colored picture) or the third picture (monochromatic colored picture), there are two processing results, including, for example, that an exceptional dark spot or dark block exists in the at least one region to be detected in the at least one image to be detected, and no exceptional dark spot or dark block exists in the at least one region to be detected in the at least one image to be detected.

Next, the server 110 judges whether there is an exceptional display region in the at least one region to be detected in the at least one image to be detected according to the image data processing result. When the processing result is that there is an exceptional display region (for example, an exceptional bright/dark spot and/or an exceptional bright/ dark block) in the at least one region to be detected in any image to be detected, it may be determined that the display exception occurs to the display region of the corresponding display device 130. When the processing result is that there is no exceptional display region in the regions to be detected in all the images to be detected, it may be determined that the display exception does not occur to the display region of the corresponding display device 130. In such a manner, image data processing is performed on the at least one region to be detected in the at least one image to be detected, and whether a display exception failure occurs to the display region of the display device 130 is automatically judged according to the image data processing result, so that the display device failure detection accuracy may be greatly improved.

When it is determined that the display exception occurs to the at least one display region of the display device 130, the server 110 outputs a failure detection result through an e-mail, instant messaging application or a short message, etc. or outputs a failure alarm to prompt the user to execute corresponding processing. Of course, before the failure detection result is sent through the e-mail, instant messaging application or the short message, etc., it is necessary to set an e-mail address of the user for receiving the e-mail, a instant messaging application account or a phone number for receiving the short message. Herein, the failure detection result may include, for example, one detection picture image or two detection picture images and a failure description. The failure description may be, for example, "there is an exceptional display region in the right upper corner of the display screen". The operation that the failure alarm is output to prompt the user may specifically be that an alarm lamp corresponding to the target display device is set and, when it is determined that the display exception occurs to the at least one display region of the target display device, the alarm lamp is controlled to flicker to prompt the user. Of course, the user may also be prompted in another method. The present disclosure is not limited thereto.

It should be noted that besides the at least one ordinary image determined as the at least one test image, the at least one detection picture image acquired and uploaded by the image acquisition device 150 may also be used as at least one test image, that is to say, the at least one test image may be any image including the at least one display region of the target display device in the storage address in the server 110.

From the above, according to the embodiments of the present application, the storage address is set to bind the display device 130 and the image acquisition device 150, the display device 130 is controlled to display the detection picture sequence in the at least one display region, the image acquisition device 150 acquires the corresponding image of the detection picture sequence and uploads the image to the server 110, and the server 110 performs image data processing on the at least one region to be detected in the image, judges whether there is an exceptional display region in the at least one region to be detected and determines whether the display exception occurs to the display region of the display device 130 according to the image data processing result. The detection picture sequence is displayed in the at least one display region to ensure that the image acquisition device 150 may acquire the two detection picture images corresponding to the pure black picture and the monochromatic light-colored picture and determine them as images to be detected, then the image data processing is performed on the regions to be detected in the two images to be detected and whether the display exception failure occurs to the at least one display region of the display device 130 according to the image data processing results, so that the display device failure detection accuracy may be greatly improved.

When the display exception occurs to the display region of the display device 130, the failure detection result is output to the user through the e-mail, instant messaging application or the short message or the failure alarm is output to timely prompt the user to execute corresponding processing on the display device 130 to ensure normal displaying of the display device 130 and minimize influence brought by the failure of the display device 130. In addition, the server 110 automatically analyzes the image to determine whether the playing failure occurs instead of observing the image with eyes to determine whether the playing failure occurs, so that the detection efficiency and accuracy may further be improved, and the manual detection cost may be reduced. Moreover, the server 110 is adopted to store a large amount of image data, so that cost in purchasing high-capacity hardware is reduced for the user.

Referring to FIG. 2, FIG. 2 is a flowchart of a display device failure detection method according to another embodiment of the present application. The display device failure detection method may be applied to detecting whether a display exception occurs to a display region of a display device, and when it is determined that the display exception occurs, sending a failure detection result to a user to prompt the user to execute corresponding processing. The display device failure detection method includes the following steps.

In S11, at least one detection picture image acquired by an image acquisition device when a target display device regularly displays a detection picture sequence is received, and at least one image to be detected is determined from the at least one detection picture image.

In S13, at least one region to be detected corresponding to at least one display region of the target display device in the at least one image to be detected is determined, and image data of the at least one region to be detected is processed to obtain at least one image processing result.

In S15, whether a display exception occurs to the target display device is judged according to the at least one image processing result.

In S17, when the display exception occurs to the target display device, a failure detection result or a failure alarm is output.

Specific details about each step refer to the working process of the display device failure detection apparatus.

Referring to FIG. 3, another embodiment of the present disclosure discloses a display device failure detection device 300. As shown in FIG. 3, the display device failure detection device 300 includes:

an image receiving module 310, configured to receive at least one detection picture image acquired by an image acquisition device when a target display device regularly displays a detection picture sequence and determine at least one image to be detected from the at least one detection picture image;

an image processing module 330, configured to determine at least one region to be detected corresponding to at least one display region of the target display device in the at least one image to be detected and process image data of the at least one region to be detected to obtain at least one image processing result; and a failure judgment module 350, configured to judge whether a display exception occurs to the target display device according to the at least one image processing result.

In addition, the display device failure detection device 300 further includes a failure display module 370, configured to, when the display exception occurs to the target display device, output a failure detection result or a failure alarm. A specific implementation process and technical effects of the display device failure detection device disclosed in the embodiment of the present disclosure may refer to the above mentioned embodiments and thus will not be elaborated.

The image processing module is configured to perform the following steps to determine the at least one region to be detected corresponding to the at least one display region of the target display device in the at least one image to be detected: at least one labeled region corresponding to the at least one display region of the target display device is labeled in at least one test image; and at least one image region corresponding to the at least one labeled region in the at least one image is determined to be detected as the at least one region to be detected, wherein the at least one test image is any image comprising the at least one display region of the target display device.

The detection picture sequence comprises a first picture, a second picture and a third picture that are sequentially displayed, wherein the first picture and the second picture are different pictures, and the first picture and the third picture are the same picture; and the first picture and the third picture are monochromatic colored pictures, and the second picture is a pure black picture.

The failure judgment module is configured to perform the following step to makes a judgment: when the at least one image processing result is that an exceptional display region is found in the at least one region to be detected in the at least one image to be detected, the display exception occurs to the target display device is determined.

Referring to FIG. 4, another embodiment of the present disclosure discloses a display device failure detection system 500. The display device failure detection system 500 includes a memory 530 and a processor 510 connected with the memory 530. The memory 530 may be, for example, a non-transitory memory, and a computer program 531 is stored therein. The processor 510 may be, for example, an embedded processor. The processor 510 runs the computer program 531 to execute the display device failure detection method to detect whether a display exception occurs to a display region of a display device, and when it is determined that the display exception occurs, and send a failure detection result to a user to prompt the user to execute corresponding processing.

Referring to FIG. 5, another embodiment of the present a disclosure discloses a computer-readable medium 700, which stores a computer-executable instruction 710. The computer-executable instruction 710 is configured to execute the display device failure detection method to detect whether a display exception occurs to a display region of a display device and, when it is determined that the display exception occurs, and send a failure detection result to a user to prompt the user to execute corresponding processing.

The computer-readable medium 700 may include, for example, a magnetic medium (for example, a hard disk, a floppy disk and a magnetic tape), an optical medium (for example, a Compact Disc Read-Only Memory (CD-ROM) and a Digital Video Disk (DVD)), a magneto-optical medium (for example, an optical disk) and a hardware device specially structured to store and execute a computer-executable instruction (for example, a Read-Only Memory (ROM), a Random Access Memory (RAM) and a flash memory). The computer-executable instruction in the computer-readable medium 700 may be executed by at least one processor or processing devices.

In addition, each component in different implementation modes of the present disclosure may also be freely combined, and any combination shall also be considered as the content disclosed in the present disclosure without departing from the concept of the present application.

In the embodiments disclosed by the present application, it should be understood that the disclosed system, device and method may be implemented in other manners. For example, the device embodiment described above is only schematic. For example, division of the units is only logical function division and another division manner may be adopted during practical implementation. For example, multiple units or components may be combined or integrated into another system or some characteristics may be neglected or not executed. In addition, coupling, direct coupling or communication connection between the displayed or discussed components may be implemented through indirect coupling or communication connection of some interfaces, devices or units, and may be in an electrical form or other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more than two units may also be integrated into a unit. The integrated unit may be implemented in a hardware form and may also be implemented in form of a combined hardware and software functional unit.

It is finally should be noted that the above embodiments are adopted not to limit but only to describe the technical solutions of the present application. Although the present disclosure is described with reference to the embodiments in detail, those of ordinary skill in the art should know that the technical solutions recorded in each embodiment may also be modified or part of technical features therein may be equivalently replaced, and the technical solutions corresponding to these modifications or replacements do not depart from the spirit and scope of the technical solutions of each embodiment of the present application.

What is claimed is:

1. A display device failure detection method, comprising:
receiving at least one detection picture image acquired by an image acquisition device when a target display device regularly displays a detection picture sequence, and determining at least one image to be detected from the at least one detection picture image;
determining at least one region to be detected corresponding to at least one display region of the target display device in the at least one image to be detected, and processing image data of the at least one region to be detected to obtain at least one image processing result; and
judging whether a display exception occurs to the target display device according to the at least one image processing result;
wherein the detection picture sequence comprises a first picture, a second picture and a third picture that are sequentially displayed, wherein the first picture and the second picture are different pictures, and the first picture and the third picture are the same picture; and the first picture and the third picture are monochromatic colored pictures, and the second picture is a pure black picture.

2. The display device failure detection method as claimed in claim 1, wherein determining the at least one region to be detected corresponding to the at least one display region of the target display device in the at least one image to be detected comprises:
labeling at least one labeled region corresponding to the at least one display region of the target display device in at least one test image; and
determining at least one image region corresponding to the at least one labeled region in the at least one image to be detected as the at least one region to be detected, wherein the at least one test image is any image comprising the at least one display region of the target display device.

3. The display device failure detection method as claimed in claim 2, wherein the at least one labeled region is smaller than or equal to the at least one display region of the target display device.

4. The display device failure detection method as claimed in claim 3, wherein receiving the at least one detection picture image acquired by the image acquisition device when the target display device regularly displays the detection picture sequence, and determining the at least one image to be detected comprises:
turning on the image acquisition device, wherein the image acquisition device is corresponding to the target display device;
when the target display device regularly displays the detection picture sequence, receiving the at least one detection picture image acquired by the image acquisition device according to a preset acquisition rule; and
determining the detection picture image to be screened as the at least one image to be detected.

5. The display device failure detection method as claimed in claim 2, wherein receiving the at least one detection picture image acquired by the image acquisition device when the target display device regularly displays the detection picture sequence, and determining the at least one image to be detected comprises:
turning on the image acquisition device, wherein the image acquisition device is corresponding to the target display device;
when the target display device regularly displays the detection picture sequence, receiving the at least one detection picture image acquired by the image acquisition device according to a preset acquisition rule; and
determining the detection picture image to be screened as the at least one image to be detected.

6. The display device failure detection method as claimed in claim 1, further comprising:
when the display exception occurs to the target display device, outputting a failure detection result or a failure alarm.

7. The display device failure detection method as claimed in claim 6, wherein receiving the at least one detection picture image acquired by the image acquisition device when the target display device regularly displays the detection picture sequence, and determining the at least one image to be detected comprises:
turning on the image acquisition device, wherein the image acquisition device is corresponding to the target display device;
when the target display device regularly displays the detection picture sequence, receiving the at least one detection picture image acquired by the image acquisition device according to a preset acquisition rule; and determining the detection picture image to be screened as the at least one image to be detected.

8. The display device failure detection method as claimed in claim 1, further comprising:
selecting the target display device from a display device list responsive to a user operation or according to a predetermined selection strategy, and outputting device information of the target display device.

9. The display device failure detection method as claimed in claim 8, wherein receiving the at least one detection picture image acquired by the image acquisition device when the target display device regularly displays the detection picture sequence, and determining the at least one image to be detected comprises:
turning on the image acquisition device, wherein the image acquisition device is corresponding to the target display device;
when the target display device regularly displays the detection picture sequence, receiving the at least one detection picture image acquired by the image acquisition device according to a preset acquisition rule; and
determining the detection picture image to be screened as the at least one image to be detected.

10. The display device failure detection method as claimed in claim 1, wherein judging whether the display exception occurs to the target display device is judged according to the at least one image processing result is comprises:
when the at least one image processing result is that an exceptional display region is found in the at least one region to be detected in the at least one image to be detected, determining that the display exception occurs to the target display device.

11. The display device failure detection method as claimed in claim 1, wherein receiving the at least one detection picture image acquired by the image acquisition device when the target display device regularly displays the detection picture sequence, and determining the at least one image to be detected comprises:
turning on the image acquisition device, wherein the image acquisition device is corresponding to the target display device;
when the target display device regularly displays the detection picture sequence, receiving the at least one detection picture image acquired by the image acquisition device according to a preset acquisition rule; and
determining the at least one detection picture image screened as the at least one image to be detected.

12. The display device failure detection method as claimed in claim 11, further comprising:
storing the at least one image to be detected to at least one specified storage address in the image acquisition device, wherein the storage address is a File Transfer Protocol (FTP) address.

13. A display device failure detection device, comprising:
an image receiving module,
an image processing module,
a failure judgment module, and
a memory, connected with the image receiving module, the image processing module and the failure judgment module, and arranged to store at least one executable instruction to configure:
the image receiving module to receive at least one detection picture image acquired by an image acquisition device when a target display device regularly displays a detection picture sequence, and determine at least one image to be detected from the at least one detection picture image;
the image processing module to determine at least one region to be detected corresponding to at least one display region of the target display device in the at least one image to be detected, and process image data of the at least one region to be detected to obtain at least one image processing result; and
the failure judgment module to judge whether a display exception occurs to the target display device according to the at least one image processing result,
wherein the detection picture sequence comprises a first picture, a second picture and a third picture that are sequentially displayed, wherein the first picture and the second picture are different pictures, and the first picture and the third picture are the same picture, and the first picture and the third picture are monochromatic colored pictures, and the second picture is a pure black picture.

14. The display device failure detection device as claimed in claim 13, wherein the image processing module is configured to perform the following steps to determine the at least one region to be detected corresponding to the at least one display region of the target display device in the at least one image to be detected:
labeling at least one labeled region corresponding to the at least one display region of the target display device in at least one test image; and
determining at least one image region corresponding to the at least one labeled region in the at least one image to be detected as the at least one region to be detected,
wherein the at least one test image is any image comprising the at least one display region of the target display device.

15. The display device failure detection device as claimed in claim 13, wherein the failure judgment module is configured to perform the following step to makes a judgment:
when the at least one image processing result is that an exceptional display region is found in the at least one region to be detected in the at least one image to be detected, determining that the display exception occurs to the target display device.

16. A display device failure detection system, comprising a memory and a processor connected with the memory, wherein the memory stores a computer program, and the processor is configured to run the computer program to perform the following method:
receiving at least one detection picture image acquired by an image acquisition device when a target display device regularly displays a detection picture sequence, and determining at least one image to be detected;
determining at least one region to be detected corresponding to at least one display region of the target display device in the at least one image to be detected, and processing image data of the at least one region to be detected to obtain at least one image processing result; and
judging whether a display exception occurs to the target display device according to the at least one image processing result;
wherein the detection picture sequence comprises a first picture, a second picture and a third picture that are sequentially displayed, wherein the first picture and the second picture are different pictures, and the first picture and the third picture are the same picture; and the first picture and the third picture are monochromatic colored pictures, and the second picture is a pure black picture.

* * * * *